Dec. 4, 1956     O. SCHUBERT, SR., ET AL     2,772,930

BEARINGS

Filed July 23, 1952

INVENTOR
OTTO SCHUBERT, SR.
OTTO SCHUBERT, JR.

BY

ATTORNEYS

United States Patent Office 2,772,930
Patented Dec. 4, 1956

2,772,930
BEARINGS

Otto Schubert, Sr., and Otto Schubert, Jr., Erlangen, Germany

Application July 23, 1952, Serial No. 300,382
Claims priority, application Germany March 21, 1952
10 Claims. (Cl. 308—238)

This invention relates to improved bearings and has particular relation to bearings in which a layer or coating of a polymerized synthetic, heat-hardenable resinous composition of the type described hereinafter is adhesively secured or connected to a metallic backing.

The main object of the present invention is to provide a novel and improved bearing of the above mentioned type, in which the surface layer or coating of polymerized synthetic resinous composition contains a plurality of fine capillary passages or cavities.

Another object of the invention is to provide a bearing of the before mentioned type, in which the surface layer or coating of polymerized resinous composition contains a plurality of fine capillary passages or cavities which are substantially not oriented and at least some of which are connected with each other.

A further object of the invention is to provide a bearing of the above mentioned type, in which the resinous coating composition contains a filler, the stability of which to influences occurring in the use of the bearing, is substantially equal to the stability of the polymerized resinous composition and which has a stronger adhesion to the synthetic resin used in the composition, than the inner adhesion, or cohesive, forces of said filler.

Still another object of the present invention is to provide a bearing of the before mentioned type, in which the resinous coating composition contains as a filler a basic silicate of aluminum and one or more metals selected from the group consisting of potassium, sodium, magnesium, lithium and iron, said basic silicate filler having the before mentioned property of stronger adhesion to the synthetic resin used in the composition, than the inner adhesion, or cohesive, forces of said filler, a preferred example of such fillers being mica.

In carrying out the present invention, as the metallic backing of the bearing, a backing consisting of a suitable metal, such as bronze, iron, or a light metal, can be used. This backing is coated with a viscous fluid or molten resinous composition, in which the resinous ingredient or binder is a synthetic resin having the following properties: (a) it can be hardened by polymerization under the action of heat, if desired in the presence of a polymerization catalyst, and converted by polymerization, under shrinking, into a hard, chemically and mechanically resistant product; (b) it adheres to mica or another filler of the above mentioned type, embedded in the resinous composition, with stronger adhesion than the inner adhesion, or cohesive, forces of the filler particles; (c) it adheres firmly to the metallic backing, in polymerized condition and (d) is resistant to lubricants and heat. As examples of synthetic resinous materials adapted to be used in carrying out the invention, heat-hardenable polyester resins, heat-hardenable silicone resins, heat-hardenable phenol-formaldehyde or phenol-furfural resins, alkyd resins and mixtures of several resins, can be mentioned. The resins can be used in liquid or molten condition, or in the form of a solution of suitable paste-like consistency.

According to the invention the resinous material is used in combination with a finely comminuted filler, the stability of which to influence occurring in the use of the bearing, is substantially equal to the stability of the polymerized resinous composition and which has a stronger adhesion to the synthetic resin used in the composition, than the inner adhesion, or cohesive, forces of said filler. In the use of such fillers, the preferred example of which is mica, during polymerization under the action of heat, if desired in the presence of a polymerization catalyst, but in the absence of super atmospheric pressure, the particles of the filler are split and fine capillary passages are formed during hardening and solidification of the composition. These capillary passages are of primary importance in the present invention as will be explained in detail further below.

In addition to mica and/or similar fillers, the resinous composition used in carrying out the invention may contain other ingredients, such as plasticizers, other fillers, catalysts and the like.

It has been found that if the above described resinous coating of the metallic backing is subjected to polymerization by heat, without the use of superatmospheric pressure, the particles of the mica filler or similar filler, which are embedded in the resin, are split during heat polymerization and thereby cause the formation of fine capillary passages, so that a hardened resinous coating or layer is formed, in which fine capillary passages or cavities are present. These passages are not oriented and at least a fraction of them is connected with each other.

The appended drawings illustrate by way of example, and without limitation, some embodiments of the invention.

In order to avoid premature wear of the bearing or its parts, the latter must be covered during movement of the element moving in contact with the bearing, with a thin film of oil. This requirement is in general always met in satisfactorily lubricated bearings during movement, but is not met if the movable parts are in a state of rest, or when they are subjected to a non-uniformly distributed load during their movement.

For example, in the case of a shaft adapted to rotate in a bearing, in the state of rest the shaft rests with its total weight practically at a single point on the bearing and thus presses aside substantially all oil between shaft and bearing. In this condition no oil film is present between shaft and bearing and, therefore, metal comes in direct contact with metal, or with the resinous material of the bearing. The same condition will persist for some time when the shaft starts to rotate so that the contacting surfaces will be under considerable strain and subjected to undue wear, which is increased by the fact that this strain always occurs at the same spot. As long as the shaft is in an eccentric position, i. e. as long as the thickness of the annular space between shaft and bearing is not approximately uniform over the periphery of the shaft, no uniform lubrication of the sliding surfaces can take place. As a consequence of this, certain portions of these surfaces, which temporarily do not receive adequate lubrication, are subjected to increased wear. This applies also to bearing surfaces consisting of synthetic resins, which will be likewise damaged in spite of their highly resistant character, in the absence of adequate lubrication.

Figure 3:
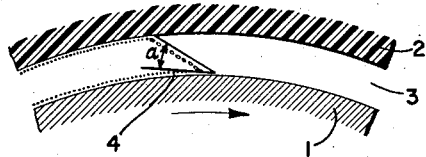
Figure 3 illustrates distribution of the lubricant in a bearing.

In general, lubrication is more intensive in synthetic resin bearings than in metal bearings. This is probably due to stronger adhesion of the particles of lubricating liquid to the resinous bearing surface. In this connection reference is made to Figure 3, in which the shaft is denoted by reference symbol 1, and the bearing surface by 2, while the air space between shaft and bearing is denoted 3 and the particles of oil are denoted 4. It will be understood that oil particles located near shaft 1, have a higher velocity than oil particles located adjacent bearing surface 2. The pressure of the liquid can be illustrated by a triangle, in which the hypotenuse of the triangle illustrates the distribution of pressure. It will be understood that the stronger adhesion to bearing surface 2 is, the smaller angle $\alpha$ will be and the smaller this angle is, the higher the pressure of liquid between surface 2 and shaft 1 will be.

If adhesion increases, the difference in the velocity of individual oil particles likewise increases and lubrication will be correspondingly improved, because, in this manner, an oil cushion is formed which more and more prevents direct contact between the shaft and the bearing surface, as the number of revolutions of the shaft increases.

If now rotation of the shaft becomes slower and finally complete state of rest occurs, movement of the oil film is also stopped. There will be no oil cushion present and the shaft moves downward in vertical direction until it comes in direct contact with the bearing surface. The shaft is now in eccentric position relative to the bearing and presses aside the lubricant located between the shaft and the bearing, in both directions from the point of contact with the bearing, so that, at best, only traces of oil remain between shaft and bearing. Substantially the same condition occurs between sliding surfaces which are operated under not uniformly distributed loads and in this case undue wear and damage to the bearing likewise frequently occur.

It has now been found that by using the present invention, the presence of sufficient amounts of lubricant can be secured between the sliding surfaces also in state of rest, so that the above described difficulties can be eliminated and permanently satisfactory operation of sliding surfaces can be obtained.

*Example 1*

A viscous, heat hardenable polyester resin is mixed with finely comminuted mica, one part by weight of the mica being mixed with 4 parts by weight of the resin. This can be done for example by first introducing the resin into a mixer and gradually adding thereto mica under stirring. Treatment in the mixer is continued for about 10 minutes so that a substantially homogeneous paste is obtained which is now applied to a metallic backing, for example a bronze bearing, in thin layer. The coated bearing is now exposed to a hardening or polymerization temperature under ordinary atmospheric pressure, in order to effect polymerization and hardening of the resinous layer. The temperature of hardening or curing depends primarily on the nature of the polyester resin used and also on the thickness of the layer applied to the metallic backing. Temperatures of 110° to 120° C. have been found satisfactory in the hardening of polyester resin compositions.

It has been found that adhesion of the mica particles to the polyester resin is stronger than the inner adhesion of the mica particles and therefore, during hardening by heat, without application of superatmospheric pressure, the mica particles are split and very fine capillary passages or cavities are thus formed in the interior of the resinous coating or layer.

After hardening and cooling to ordinary room temperature, the surface of the resinous layer is subjected to machining in order to obtain the desired exact shape and dimensions.

*Example 2*

A viscous alcoholic solution containing 78 parts by weight of heat-hardenable phenol-formaldehyde resin is mixed with 22 parts by weight of finely comminuted mica. Mixing is carried out and the composition obtained is used for carrying out the invention, in the manner described in Example 1.

Hardening of the resinous layer on the metallic backing is carried out at about 320° F. under ordinary atmospheric pressure.

*Example 3*

82 parts by weight of a molten heat-hardenable phenol-furfural resin is mixed with 18 parts by weight of finely comminuted mica. Mixing is carried out and the composition obtained is used for carrying out the invention, in the manner described in Example 1.

Hardening of the resinous layer on the metallic backing is carried out at about 340°–350° F. under ordinary atmospheric pressure.

*Example 4*

To 80 parts by weight of a polyester resin in molten condition or dissolved to a viscous solution in a monomer, a catalytic amount, e. g. 1%, of benzyl peroxide and 20 parts by weight of finely comminuted mica are gradually added. Mixing is carried out and the composition obtained is used for carrying out the invention, in the manner described in Example 1.

Hardening of the resinous layer on the metallic backing is carried out at about 110°–120° C. under ordinary atmospheric pressure.

*Example 5*

40 parts by weight of a molten heat-hardenable phenol-formaldehyde resin are mixed with 40 parts by weight of molten phenol-furfural resin, and to the mixture 20 parts by weight of finely comminuted mica are gradually added. Mixing is carried out and the composition obtained is used for carrying out the invention, in the manner described in Example 1.

Hardening of the resinous layer on the metallic backing is carried out at about 340° F. under ordinary atmospheric pressure.

*Example 6*

A viscous alcoholic solution containing 80 parts by weight of phenol-formaldehyde resin is mixed with 15 parts by weight of finely comminuted mica and 5 parts by weight of a likewise finely comminuted basic sodium-magnesium-aluminum silicate. Mixing is carried out and the composition obtained is used for carrying out the invention, in the manner described in Example 1.

Hardening of the resinous layer on the metallic backing is carried out at about 320° F. under ordinary atmospheric pressure.

*Example 7*

An equal amount of silicone resin, for example a methyl silicone resin, is substituted for the polyester resin used in Example 1 and a bearing is prepared in the manner described in said example, but effecting polymerization of the resin at a temperature of about 400° F.

As shown by the above examples, the present invention fundamentally differs from the known suggestions for improving the durability of lubricated sliding surfaces. It has been suggested previously to use lubricants of particular composition and/or to prevent direct contact between the sliding surfaces by particular structural designs of the sliding surfaces. Premature wear of the sliding surfaces could not be satisfactorily prevented by these suggestions.

According to the present invention, the adhesion characteristics of synthetic resinous materials are utilized in order to obtain a particularly high pressure of the liquid lubricant. However, the adhesive capacity of the resinous material is essentially supported and strengthened according to the invention by the presence of fine capillary passages or cavities in the resinous layer or coating, because these passages or cavities have always a sucking effect on the passing oil. As a result of this effect, a thin film of oil will permanently adhere to and be kept in contact with the bearing. In the use of bearings embodying this invention, the oil film present on the surface of the bearing will not be broken or interrupted even in the case of shafts rotated at high speed, while such break in the oil film often occurs in the use of conventional bearings. As mentioned above, the pressure of the liquid lubricant is increased under such conditions and the intensity of lubrication during movement of the gliding surfaces is distinctly improved.

In other words, the presence of fine capillary passages or cavities according to the present invention in the resinous surface layer of the bearings, has a double effect; it improves quality of lubrication during movement of the sliding surfaces by increased pressure of the liquid and furthermore and first of all, owing to the presence of said capillary passages, the presence of lubricant between shaft and bearing is secured also in the state of rest of the shaft or other sliding surface and also in cases in which the sliding surfaces are operated under not uniformly distributed load. This last mentioned result is fundamentally novel and unobvious and of considerable importance in view of the increased life period of bearings and the like.

Owing to the pressure exerted by a shaft, in its state of rest, on the surface of a bearing according to the present invention, the resinous surface layer of the bearing and the oil present in the capillary passages are put under pressure and oil will be thus pressed from the directly adjacent capillary passages to the surface so that a relatively thick oil cushion is formed in front of the shaft.

As the capillary passages located under the shaft are also filled with oil, this oil will come in contact with the shaft, although first at one point only. As many of the fine capillary passages discharge to the inner surface of the resinous coating, there will be actually a fine film of oil present all over the resinous bearing surface. If now the shaft is rotated, it will be provided with an oil film over its entire surface so that there will be no direct contact between the surface of the shaft and that of the bearing. This oil film may be relatively thin at the beginning of rotation, but the particularly destructive contact in the absence of lubricant, is eliminated. The thickness of the oil film is very quickly increased after the start of rotation because breaking of the thin oil film is prevented by the presence of the capillary passages and moreover the thickness of the film is increased under the action of the increasing pressure of liquid. Thus, return of the shaft to a normally lubricated position takes place with particular speed in bearings according to the present invention.

Figure 1:
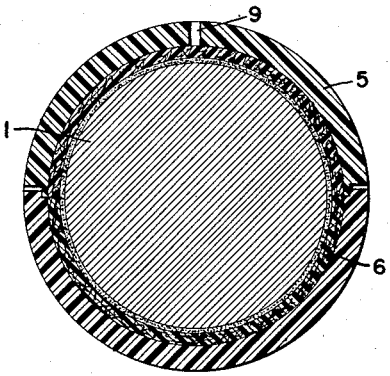
Figure 1 illustrates the structure of a bearing for a shaft, according to the invention.
Figure 2:
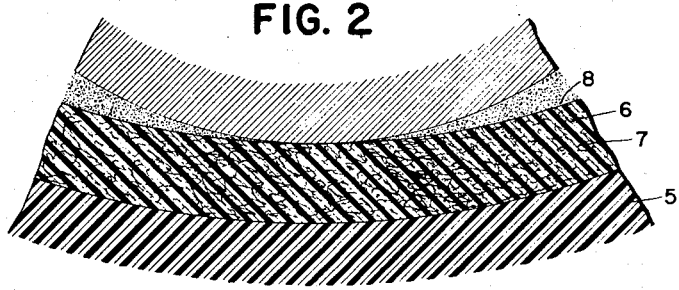
Figure 2 illustrates a section of the bearing shown in Figure 1, on an enlarged scale.

In the diagrammatic illustration of Figure 1, the bearing consists of an outer ring 5 which consists for example of iron, bronze or other material, for example a resinous material. The inner surface of ring 5 is provided with a layer 6 of polymerized and hardened synthetic resinous composition. This layer contains very fine capillary passages 7 which are best shown in Figure 2. The capillary passages 7 are not oriented and they extend through the entire layer 6, irrespective of the specific thickness of said layer. These capillary passages increase adhesion of the lubricant to resinous layer 6 because said capillary passages have a sucking effect on the lubricant during movement of the sliding surfaces.

As layer 6 is permeated with lubricant, supply of the lubricant can take place through bores 9 provided in outer ring 5 (see Figure 1).

It will be understood that the invention is not limited to the specific materials, proportions, steps and other specific details described above and can be carried out with various modifications. For example, a mixture of two or more resinous binders and/or a mixture of two or more fillers can be used. The resin and the filler are used in a ratio by weight of 4:1 with a tolerance of ±10%. The polymerization catalysts are used in conventional amounts and they are preferably added to the resinous composition shortly before application of the latter to the metallic backing. The viscosity of the resinous composition depends primarily on the nature of the synthetic resin used, and compositions of, for example, 350 centipoises at 20° C. proved to be satisfactory. The resinous layer applied to the metallic backing is preferably subjected to machining after polymerization, in order to obtain predetermined exact dimensions and exact shape of the surface. The resinous layer can also be prepared and polymerized by itself in a shape fitting a metallic backing and the layer thus obtained can be connected with the metallic backing by means of a suitable resinous composition. However, it is preferred to apply the resinous composition to the metallic backing in paste-like condition and carry out polymerization in situ. Furthermore, the resinous compositions used in carrying out this invention are also suitable for mending or restoring damaged sliding surfaces consisting of resinous compositions or other materials.

It has been found that the resinous layers used in the present invention adhere firmly and permanently to the metallic backing, and the novel effect of the invention is obtained during the entire lifetime of the sliding surfaces embodying the invention. As stated above, this effect consists not only in an intensification of lubrication in general, but in the fundamentally novel effect of preventing, by the action of the capillary passages which become filled with lubricant, direct contact of the sliding surfaces, i. e. in the absence of lubricant, particularly in state of rest of the bearing or the like, and thus eliminating the most dangerous influence which adversely affects durability of sliding surfaces in the conventional structures.

While the invention has been explained, by way of example, in connection with bearings and rotating elements, it will be understood that the invention is not limited thereto and can be equally applied to sliding surfaces in structures of any other type.

In carrying out the present invention, the filling material of mica or the like is used in comminuted condition, in which the average diameter of particles is preferably in the range of 0.03 to 0.3 mm. As mentioned above it is essential that the synthetic resinous binder should shrink during polymerization and it has been found in general the shrinkage amounts to 40 to 80% based on the volume of the undissolved resin prior to polymerization. The dimensions of the capillary passages in the polymerized resinous layer depend primarily on the nature of the resin used, as well as the dimensions of the filler particles and it has been found that, in general, said passages have a cross-sectional area of 0.5 to 5 $\mu$. The thickness of the coating to be applied to the metallic backing may, of course, also vary and is preferably in the range of 0.1 to 0.5 mm.

What is claimed is:

1. Bearing comprising in combination a metallic backing and a sliding surface layer consisting of a thin layer of hard, polymerized, synthetic resinous composition applied to the metallic surface of the backing, and hardened by heat under atmospheric pressure, comprising a thermosetting resin which undergoes shrinkage during polymerization and a comminuted filler having a stronger adhesion to the resinous binder than the inner adhesion forces of said filler, said layer containing a plurality of not oriented capillary passages, at least some of which discharge to the surface of said layer and at least some of which are connected with each other, said layer being capable of taking up lubricant and discharging it during movement of the sliding surfaces.

2. A bearing as claimed in claim 1, in which the filler is a basic silicate of aluminum and at least one metal selected from the group consisting of potassium, sodium, magnesium, lithium and iron.

3. A bearing as claimed in claim 1, in which the filler is mica.

4. A bearing as claimed in claim 1, in which the resinous binder and the filler are used in a ratio by weight of about 4:1.

5. A bearing as claimed in claim 1, in which the resinous binder is a thermosetting polyester resin.

6. Bearing comprising in combination a metallic backing and a sliding surface layer applied to said backing, said layer consisting of a heat-hardened, polymerized, synthetic resinous composition comprising a thermosetting resin which undergoes shrinkage during polymerization and a comminuted filler having a stronger adhesion to the resinous binder than the inner adhesion forces of said filler, said layer containing a plurality of not oriented capillary passages, at least some of which discharge to the surface of said layer and at least some of which are connected with each other, said layer being capable of taking up lubricant and discharging it during movement of the sliding surfaces.

7. Bearing as claimed in claim 6, in which the filler is finely comminuted mica.

8. Bearing as claimed in claim 6, provided with a conduit for supplying lubricant through the metallic backing, to the resinous sliding surface.

9. A process for producing a metallic bearing provided with a plastic sliding surface layer, comprising applying to the surface of the metal a resinous composition containing finely comminuted mica and a thermosetting resin which undergoes shrinkage during polymerization, the ratio by weight of mica to resin being about 1:4, to a metallic backing, to form a coating on said backing, and subjecting said coating to polymerization by heat under substantially atmospheric pressure to split the mica to form a plurality of not oriented capillary passages in the interior of the coating.

10. A process as claimed in claim 9, in which the polymerized surface layer is subjected to machining in order to obtain exact predetermined shape and dimensions of the layer.

References Cited in the file of this patent

UNITED STATES PATENTS

| Number | Name | Date |
|---|---|---|
| 1,880,987 | Silhavy | Oct. 4, 1932 |
| 2,219,054 | Palm et al. | Oct. 22, 1940 |
| 2,277,167 | Steiner | Mar. 24, 1942 |
| 2,456,995 | Robinson | Dec. 21, 1948 |
| 2,459,598 | Stott | Jan. 18, 1949 |
| 2,494,023 | Williams | Jan. 10, 1950 |
| 2,534,408 | Bramberry | Dec. 19, 1950 |
| 2,610,959 | Nordlander | Sept. 16, 1952 |
| 2,635,929 | Brophy et al. | Apr. 21, 1953 |

FOREIGN PATENTS

| Number | Country | Date |
|---|---|---|
| 462,730 | Canada | Jan. 24, 1950 |